(12) United States Patent
Agarwal et al.

(10) Patent No.: US 6,735,349 B1
(45) Date of Patent: May 11, 2004

(54) METHOD AND SYSTEM FOR DUAL SPATIAL OR TEMPORAL SCALING

(75) Inventors: Sandeep Agarwal, Fremont, CA (US); Arun Johary, San Jose, CA (US)

(73) Assignee: Genesis Microchip Inc., Alviso, CA (US)

( * ) Notice: Subject to any disclaimer, the term of this patent is extended or adjusted under 35 U.S.C. 154(b) by 0 days.

(21) Appl. No.: 09/396,299

(22) Filed: Sep. 15, 1999

(51) Int. Cl.[7] .................................................. G06K 9/32
(52) U.S. Cl. ........................................ 382/298; 382/300
(58) Field of Search ................................ 382/298, 300, 382/299; 358/1.2, 525, 451; 348/581

(56) References Cited

U.S. PATENT DOCUMENTS

| | | | | |
|---|---|---|---|---|
| 4,471,349 A | * | 9/1984 | Strolle | 345/657 |
| 4,667,302 A | * | 5/1987 | Mackey et al. | 708/272 |
| 4,757,465 A | * | 7/1988 | Hakoopian et al. | 364/723 |
| 5,371,533 A | * | 12/1994 | Lewins | 348/257 |
| 5,506,583 A | * | 4/1996 | McVicker | 342/25 |
| 6,121,808 A | * | 9/2000 | Gaudet | 327/231 |
| 6,379,304 B1 | * | 4/2002 | Gilbert et al. | 600/447 |

* cited by examiner

*Primary Examiner*—Yon J. Couso
(74) *Attorney, Agent, or Firm*—Beyer Weaver & Thomas LLP

(57) ABSTRACT

A method and system for scaling an image in accordance with the present invention is disclosed. The method utilizes a plurality of interpolators operating in parallel. Each interpolator operates with a different spatial offset with respect to the other. The final output is the average the output of each interpolator. Normally the initial value of the horizontal and vertical DDA's is zero. Offset is introduced by introducing an initial value in the DDA. Offset has the physical effect of manipulating the weights required for the averaging process in interpolation. Horizontal offset is the initial value in the Horizontal DDA while the vertical offset is the initial value in the Vertical DDA. The present invention relates to implementation in a semiconductor integrated circuit but the concepts can be used in software based image resizing (scaling) algorithms too.

13 Claims, 6 Drawing Sheets

10
Source pixels 12
destination pixels

METHOD AND SYSTEM FOR DUAL SPATIAL OR TEMPORAL SCALING

FIELD OF THE INVENTION

The present invention relates to graphics systems and more particularly to a method for scaling images created by such a system.

BACKGROUND OF THE INVENTION

When the resolution of a bit map image is required to be changed, one needs to take each pixel in the destination image and map it onto the source image. The coordinates of the destination pixel could point to a pixel in the source image or to a location that lies between the source pixels. Depending on the location of the destination pixel, it can be set to a mathematical combination of pixels in the source image that are physically close to the destination pixel (neighboring pixels). FIG. 1 depicts such a mapping process. The black rectangles 10 represent the original pixel map while the circles 12 represent the pixels in the destination image. In this embodiment each destination pixel has four nearest neighbor source pixels and twelve second nearest neighbor source pixels. However, some of the destination pixels directly map onto the source pixels, as in the case of corner pixels in the illustration below.

Bilinear Interpolation

This method of computing destination pixel values is by taking the weighted average of four nearest-neighbor source pixels. The weights decrease linearly with the distance of the neighboring source pixels from the destination pixel. While this technique gives reasonable results for most source images, it causes non-uniformity when the source image consists of high-resolution periodic patterns such as single pixel pinstripe or checkerboard images. For such images, bilinear interpolation leads to non-uniform scaling and regions of high and low contrast appear on the image. In the frequency domain, this effect is called aliasing. Spatially, it can be seen to occur because of non-uniform weights to the destination pixels in the averaging process. High contrast regions correspond to pixels in the destination image, which are close to the source image and do not undergo the averaging process. Low contrast regions correspond to destination pixels that lie near the center of the square formed by the four nearest neighbor source pixels. It is highly desirable to reduce (if not completely eliminate) this contrast non-uniformity.

The value of a destination pixel in bilinear interpolation can be written as:

$$P_d = \sum_{i=1}^{i=4} C_i P_{si}$$

Where $P_d$ is the destination pixel, $P_{si}$ is the $i^{th}$ pixel in the source image and $C_i$ is the weight associated with the $i^{th}$ pixel. Note that there are four multiply and three add operations associated with each destination pixel. Normally the two dimensional operation is decomposed into separate row and column operations horizontal interpolator 20 and vertical interpolator 22 to reduce the complexity of calculation as shown in FIG. 2. The implementation requires at least four line buffers 24 to store the source pixels.

The weights for horizontal and vertical interpolation are determined by the value of horizontal and vertical digital data accumulators increment as inverse of the respective scaling ratios. The higher the resolution of the accumulator, the better is the accuracy of scaling ratio. Accordingly, through this system contrast uniformity is uneven.

Alternative Solutions

There are a few known ways to reducing the above described contrast non-uniformity.

Non-linear Interpolation

One class of techniques uses higher order interpolation to reduce the contrast non-uniformity. Higher order interpolation leads to better low pass filtering of the input data thereby reducing the extent of aliasing in the image. Higher order interpolation techniques could be based on biquadratic or bicubic interpolation. Both these techniques use more than the nearest neighbor pixels in the source image to generate a destination pixel. Therefore, instead of doing a weighted average of four pixels, these methods perform a weighted average of nine or sixteen pixels respectively. Normally bicubic interpolation requires sixteen multiply and fifteen add operations for each destination pixel. Again the interpolation process can be decomposed into separate row and column operations. Each row and column operation requires four multiply and three add operations only to reduce the complexity of overall computation considerably. Bicubic interpolation also requires higher memory storage in comparison to bilinear interpolation.

Digital Filters

FIR (finite impulse response) digital filters can be used for interpolation. These filters can average several more neighboring pixel in the source image to achieve a tradeoff between filter complexity and image uniformity. The drawback of using higher order digital filters is that both computational complexity and memory storage required goes up considerably as the order of filter is increased.

The present invention relates to implementation in a semiconductor integrated circuit but the concepts can be used in software based image resizing (scaling) algorithms too.

Accordingly, what is needed is a system and method for scaling images that overcomes the problems associated with prior art techniques. The system and method should be cost effective and easily implemented in existing graphics signals. The present invention addresses such a need.

SUMMARY OF THE INVENTION

A method and system for scaling an image in accordance with the present invention is disclosed. In a first aspect at least two interpolators operate in parallel. Each interpolator operates with a different spatial offset with respect to the other. The final output is the average the output of each interpolator. Normally the initial value of the horizontal and vertical DDA's is zero. Offset is introduced by introducing an initial value in the DDA. Offset has the physical effect of manipulating the weights required for the averaging process in bilinear interpolation. In a second aspect, one interpolator causes either an initial phase of the interpolator to be programmable temporally, or its spatial interpolation coefficients are program using a lookup table. The present invention relates to implementation in a semiconductor integrated circuit but the concepts can be used in software based image resizing (scaling) algorithms too.

DETAILED DESCRIPTION

The present invention relates to graphics systems and more particularly to a method for scaling images created by such a system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Multiple Interpolators

There are two methods of achieving nonlinear interpolation. In the first method, two or more interpolators are used in tandem. In the second method only one interpolator is used with either the offset of the interpolator is switched in time or its coefficients programmable through a lookup table. In this method one can use two or more instances of the interpolating hardware. Each interpolator runs with its own initial offset. The final output is the average of the various individual interpolators. Since parallel interpolation operation requires several interpolators to operate in tandem, it is expensive in terms of hardware cost. Such an implementation is not cost effective for more than two parallel interpolators.

Figure 1:
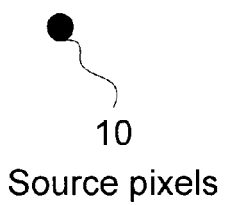
FIG. 1 shows a conventional mapping process for changing the resolution of a bitmap image.
Figure 1:
Figure 1:
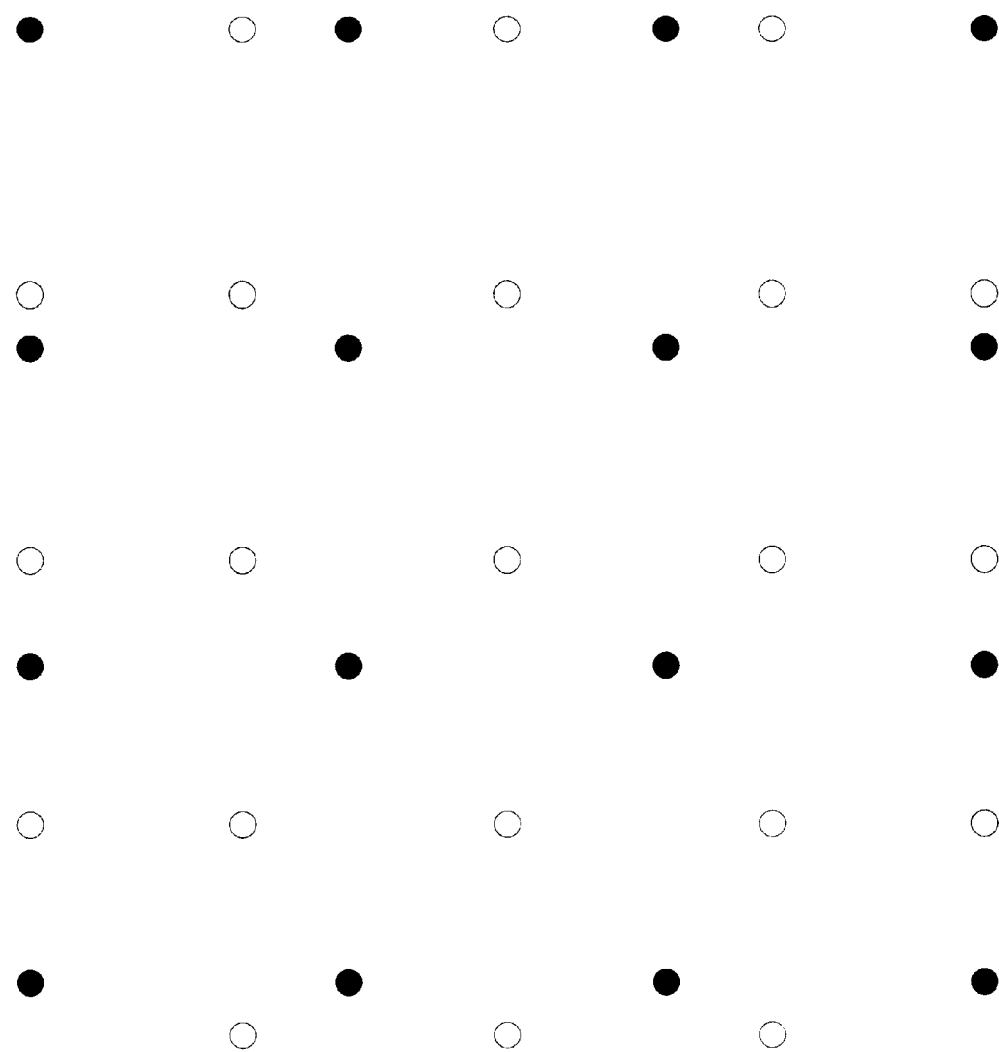
Figure 2:
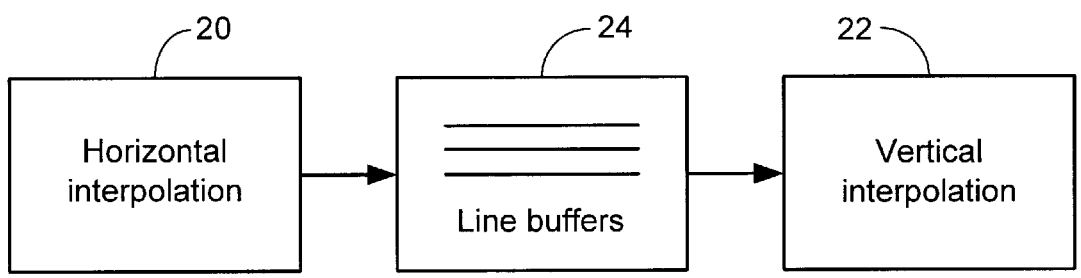
FIG. 2 shows the two dimensional operation decomposed into separate row and column operations to reduce the complexity of calculation.
Figure 3:
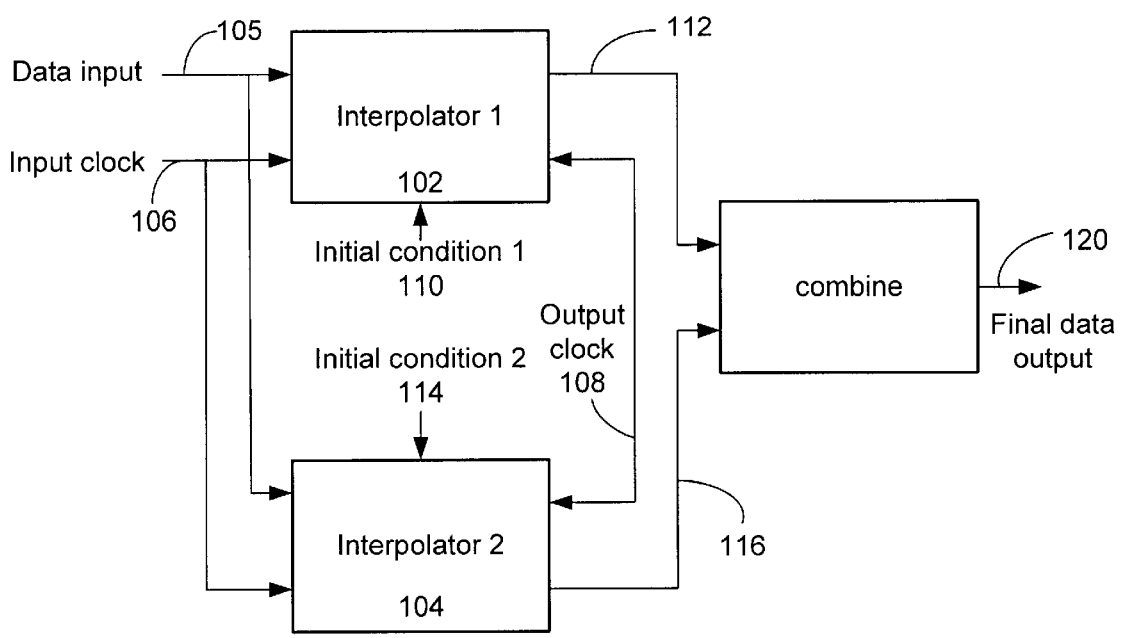
FIG. 3 is a simple block diagram of one embodiment of the system in accordance with the present invention.

FIG. 3 is a simple block diagram of one embodiment of the system in accordance with the present invention. System 100 includes first and second interpolators 102 and 104 which receive a data input signal 105, an input clock signal 106, and an output clock signal 108. Interpolator 102 also receives a first initial condition signal 110 and provides a first data output signal 112. Interpolator 104 also receives a second initial condition signal 114 and provides a second data output signal 116. Data output signals 112 and 116 are provided to combine unit 118 to provide a final data output signal 120. In a first aspect, the method and system utilizes a plurality of interpolators 102 and 104 operating in parallel. Each interpolator 102 and 104 operates with a different spatial offset with respect to the other. The final output is the average the output of each interpolator.

Normally the initial value of the horizontal and vertical DDAs within the interpolators 102 and 104 is zero. Offset is introduced by introducing an initial value in the DDA. Offset has the physical effect of manipulating the weights required for the averaging process in bilinear interpolation. Horizontal offset is the initial value in the Horizontal DDA while the vertical offset is the initial value in the Vertical DDA.

Figure 4:
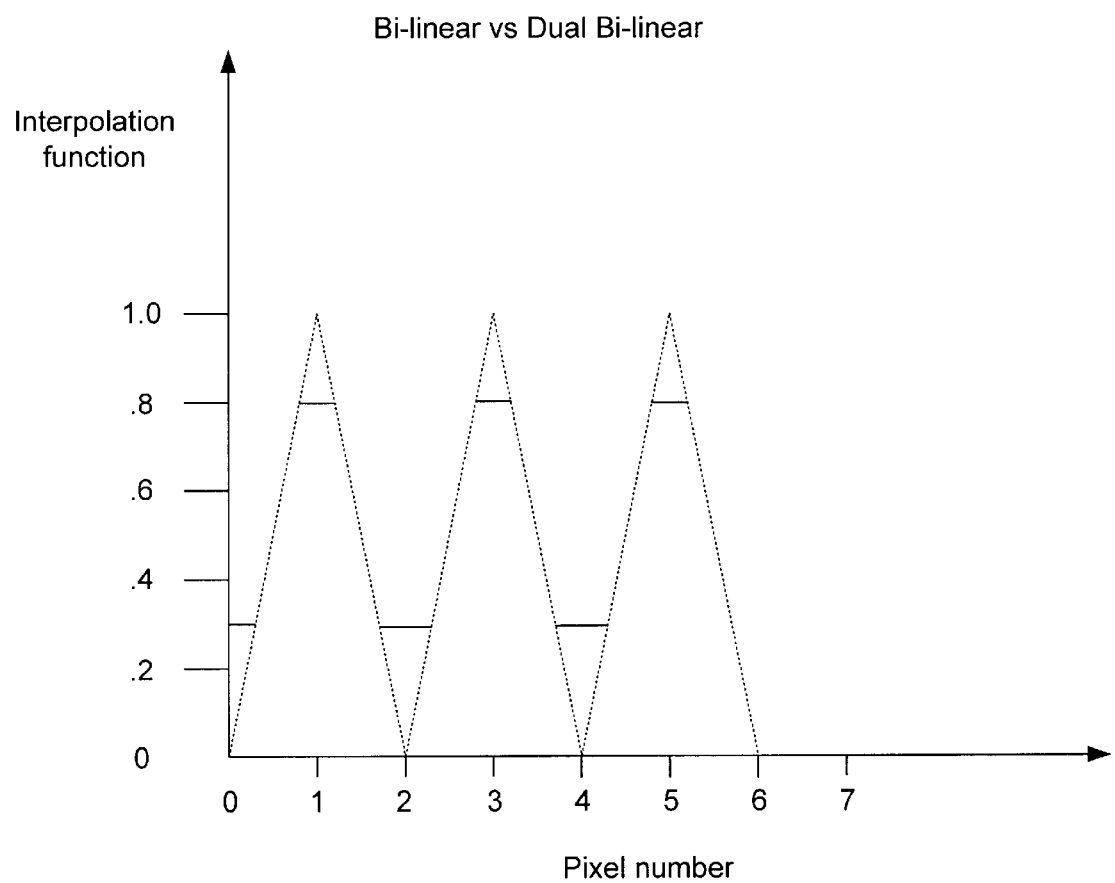
FIG. 4 plots the interpolation functions for an image in which adjacent pixels are switching between two levels.

The effect of operating several interpolators in parallel is to reduce the contrast variations for images with high spatial resolution while retaining the characteristics of bilinear interpolation for other images. This is illustrated in FIG. 4 below for the case of one-dimensional interpolation. In the case of one dimensional interpolation, the interpolation function varies linearly between the two levels as expected. The interpolation function is computed by averaging the outputs of two interpolators that have an offset of +/−0.25 pixels respectively. FIG. 4 plots the interpolation functions for an image in which adjacent pixels are switching between two levels.

Figure 5:
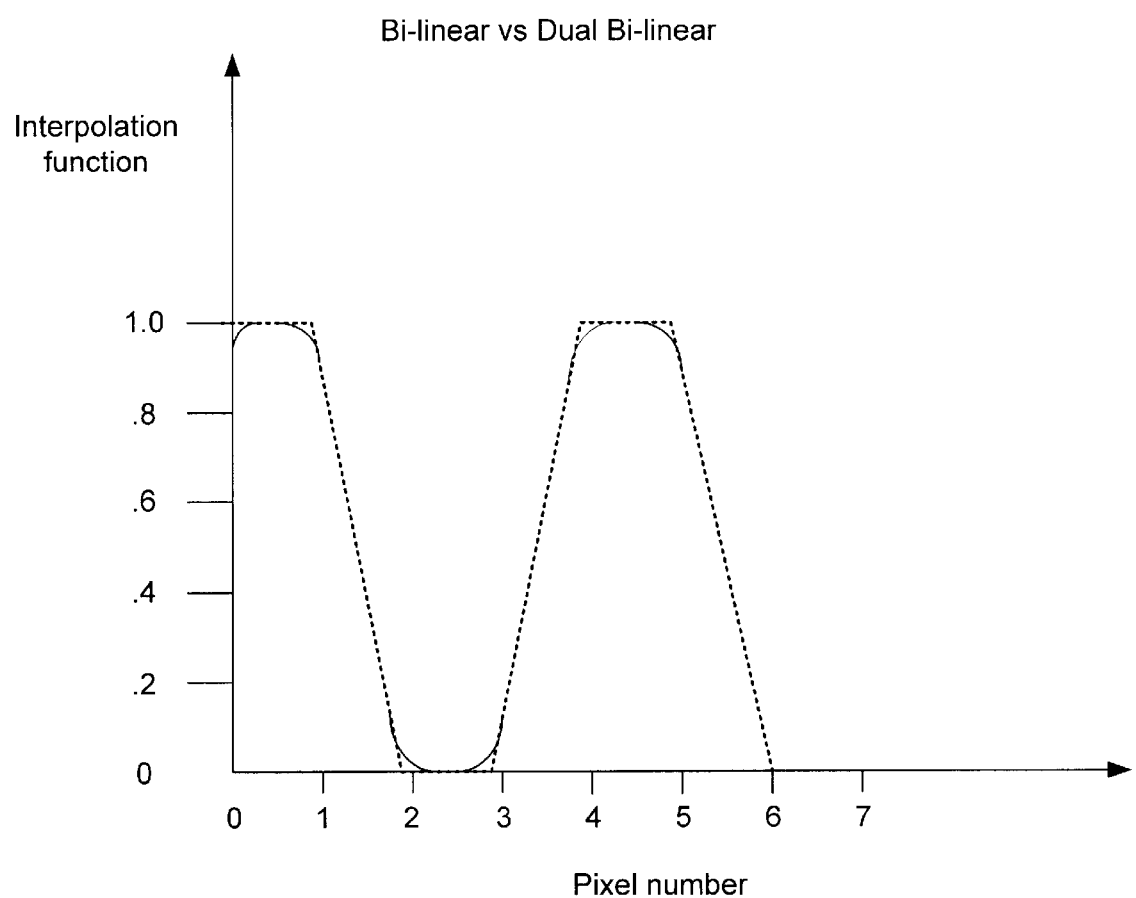
FIG. 5 plots the interpolation functions in which the pixel levels switch after two adjacent pixels instead of one.

Note that the interpolation function saturates near the source pixel locations. This leads to reducing the contrast in high contrast regions without affecting the low contrast regions in the destination image. FIG. 5 plots the two interpolation functions in which the pixel levels switch after two adjacent pixels instead of one. Note that the two interpolation functions appear similar with full swing across source pixel values. This ability of the dual interpolator to restrict the contrast values for high-resolution features leads to high contrast uniformity in images which have periodic high-resolution patterns.

Single Interpolator

Figure 6:
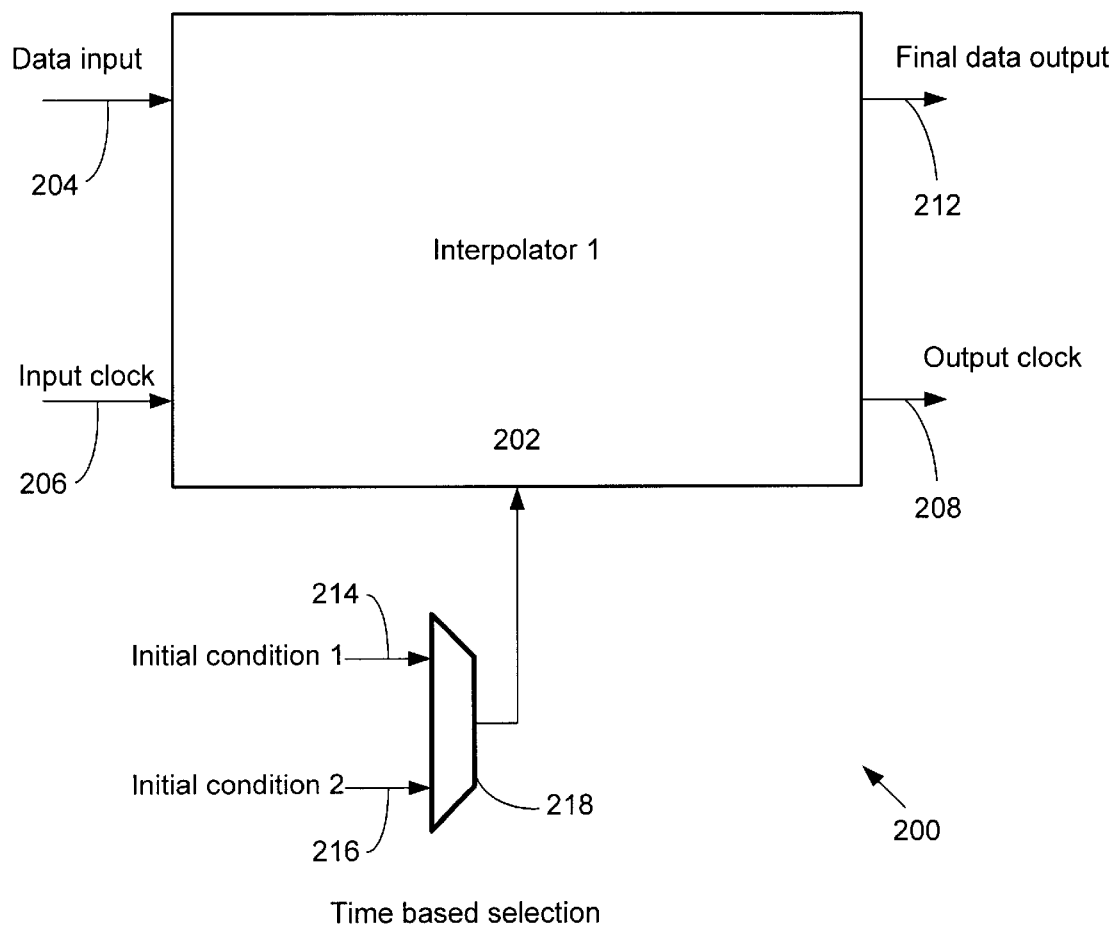
FIG. 6 is a simple block diagram of a second embodiment of a system in accordance with the present invention.

In the case where the same image is refreshed multiple times on to the display device (like a monitor), one can use only one instance of the interpolating hardware. FIG. 6 is a simple block diagram of a second embodiment of a system in accordance with the present invention. The interpolator 202 receives data input 204, an input clock 206 and an output clock 208. The interpolator 202 also receives a signal from a multiplexer 210 and provides a final data output 212. The multiplexer 210 receives first and second initial conditions 214 and 216 which are selected in a time based manner by signal 218. During every refresh pass, one can change the offset of the interpolator 202. Therefore, the image produced in every pass is slightly different from the previous image. The human eye then averages these different (slightly out of phase) images to give the perception of a better image. Such an implementation is extremely cost effective especially if the offsets toggle between two values. The temporal offset has to take into account the response time of the display device for flicker free image quality.

A similar offset can be obtained by using a single interpolator by making spatial interpolation coefficients programmed using a lookup table to emulate the nonlinear interpolation function.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for an image that is refreshed multiple times on a display device comprising:

providing an interpolator;

at the interpolator, receiving data input, an input clock signal, and an output clock signal;

receiving a set of time based initial conditions; during a refresh period, generating a first image based upon a first offset value by the interpolator and displaying the image; and during a next refresh period, generating a second image based upon a second offset value that is different than the first offset value by the interpolator wherein the offsets are used to manipulate weights in the interpolation of input data, and wherein the first and second offset values form a programmable temporal sequence of initial offset values such that the offset values are automatically changed every refresh period.

2. The method of claim 1 in which the offset is in any combination of x and y dimension.

3. The method of claim 1 in which an initial offset value of the interpolator is automatically changed every frame or refresh period.

4. The method of claim 1 in which a temporal sequence of initial offsets of the interpolator is algorithmically generated using a digital data accumulator (DDA).

5. The method of claim 1 wherein a plurality of spatial interpolation coefficients are programmed using a look-up table to emulate a non-linear interpolator function.

6. The method of claim 1 in which a temporal sequence of initial offsets of the interpolator are programmable.

7. The method of claim 6 in which the temporal sequence of initial offsets of the interpolator is programmable using a lookup table.

8. A system for scaling an image, comprising:

means for providing an interpolator;

means for receiving data input, an input clock signal, and an output clock signal;

means for receiving a set of time based initial conditions;

means for generating a first image based upon a first offset value by the interpolator and displaying the image; and means for generating a second image based upon a second offset value that is different than the first offset value by the interpolator wherein the programmable offset is used to manipulate weights in the interpolation of input data and wherein the first and second offset values form a programmable temporal sequence of initial offset values such that the offset values are automatically changed every refresh period.

9. The method of claim 8 in which an initial offset value of the interpolator is automatically changed every frame or refresh period.ate weights in the interpolation of input data.

10. The system of claim 8 in which the temporal sequence of initial offsets of the interpolator is programmable using a lookup table.

11. The system of claim 8 in which the offset is in any combination of x and y dimension.

12. The system of claim 8 in which a temporal sequence of initial offsets of the interpolator are programmable.

13. The system of claim 12 in which the temporal sequence of initial offsets of the interpolator is algorithmically generated using a digital data accumulator (DDA).

* * * * *

UNITED STATES PATENT AND TRADEMARK OFFICE
CERTIFICATE OF CORRECTION

PATENT NO. : 6,735,349 B1 Page 1 of 1
DATED : May 11, 2004
INVENTOR(S) : Agarwal et al.

It is certified that error appears in the above-identified patent and that said Letters Patent is hereby corrected as shown below:

Column 1,
Line 67, should read -- data accumulators (DDA) within the interpolators 20 and 22 respectively. The accumulators increment as inverse of the respective scaling ratios. --

Signed and Sealed this

Tenth Day of August, 2004

JON W. DUDAS
*Acting Director of the United States Patent and Trademark Office*